(12) United States Patent
McCool

(10) Patent No.: US 6,849,962 B2
(45) Date of Patent: Feb. 1, 2005

(54) GROUND BASED AIRCRAFT ELECTRICAL POWER GENERATION SYSTEM HAVING A VOLTAGE REGULATOR THAT SELECTS FROM MULTIPLE POINTS OF REGULATION

(75) Inventor: Bradley A. McCool, Mishawaka, IN (US)

(73) Assignee: Honeywell International Inc., Morristown, NJ (US)

( * ) Notice: Subject to any disclaimer, the term of this patent is extended or adjusted under 35 U.S.C. 154(b) by 175 days.

(21) Appl. No.: 10/349,044

(22) Filed: Jan. 21, 2003

(65) Prior Publication Data

US 2004/0140673 A1 Jul. 22, 2004

(51) Int. Cl.⁷ .............................................. H02G 11/00
(52) U.S. Cl. ......................... 290/1 R; 322/22; 307/19; 191/12.4
(58) Field of Search ................................. 290/1 R, 1 A; 322/22, 23; 307/19; 191/12.4

(56) References Cited

U.S. PATENT DOCUMENTS

| | | | |
|---|---|---|---|
| 3,809,996 A | 5/1974 | Meisenheimer | 322/28 |
| 3,859,481 A * | 1/1975 | Sprague | 191/12 R |
| 3,983,471 A | 9/1976 | Itoh et al. | 322/28 |
| 4,036,147 A * | 7/1977 | Westling | 104/23.1 |
| 4,238,722 A | 12/1980 | Ford | 320/25 |
| 4,356,402 A | 10/1982 | Morimoto et al. | 307/19 |
| 4,620,339 A * | 11/1986 | Shepheard | 14/71.5 |
| 4,692,569 A * | 9/1987 | Winner | 191/12 R |
| 4,730,089 A * | 3/1988 | Pepper | 191/12.4 |
| RE32,687 E * | 6/1988 | Shepheard | 14/71.5 |
| 4,825,986 A | 5/1989 | Pepper | 191/12.4 |
| 5,055,765 A | 10/1991 | Rozman et al. | 322/22 |
| 5,117,174 A | 5/1992 | Kessler | 322/21 |
| 5,302,857 A | 4/1994 | Charles et al. | 307/20 |
| 5,512,812 A | 4/1996 | Ono | 322/28 |
| 5,587,647 A * | 12/1996 | Bansal et al. | 322/45 |
| 5,789,928 A | 8/1998 | Baker | 324/623 |
| 5,810,135 A | 9/1998 | Reilly et al. | 191/12.4 |
| 6,188,203 B1 | 2/2001 | Rice et al. | 322/25 |
| 6,384,488 B1 | 5/2002 | Bucharelli et al. | 307/9.1 |
| 6,476,509 B1 | 11/2002 | Chen et al. | 290/1 R |

* cited by examiner

Primary Examiner—Nicholas Ponomarenko
(74) Attorney, Agent, or Firm—Douglas A. Mullen, Esq.

(57) ABSTRACT

A ground-based aircraft electrical power generation system for regulating the electrical power to an aircraft being serviced on the ground. The aircraft electrical power generation system may include a ground power cart, a power source located on the ground power cart and having an output terminal, and a power cable having a proximate end coupled to the output terminal of the power source and a distal end configured to be coupled to the aircraft. The aircraft electrical power generation system further may include a voltage regulator having a plurality of inputs and an output coupled to the power source. The voltage regulator monitors the voltage at the plurality of inputs representing the voltage sensed at multiple points of regulation. A contactor also may be coupled in series between the proximate end of the power cable and the distal end of the power cable.

20 Claims, 1 Drawing Sheet

GROUND BASED AIRCRAFT ELECTRICAL POWER GENERATION SYSTEM HAVING A VOLTAGE REGULATOR THAT SELECTS FROM MULTIPLE POINTS OF REGULATION

BACKGROUND OF THE INVENTION

1. Field of the Invention

The present invention relates generally to an external electric power generation system for supplying power to an aircraft being serviced on the ground, and more particularly to a ground-based aircraft electric power generation system having a voltage regulator that selects from multiple points of regulation.

2. Description of the Related Art

Electrical power generation systems are often located externally on ground power carts at airports for providing electrical power to aircraft. More specifically, an electrical power generation system, sometimes contained in a wheeled ground power cart, supplies electrical power to an aircraft while the aircraft is being serviced on the ground. Electrical power is supplied from a power source located on the ground power cart to the aircraft via a cable that may range in length from 40 feet to 80 feet or even greater. To provide electrical power to the aircraft, a worker connects the end of the cable to a receptacle on the aircraft and operates a power switch, located on the ground power cart, to apply voltage to the cable. In order to save time, the worker sometimes may turn on the power switch before connecting the cable to the receptacle on the aircraft. While procedures may be in place to prevent this scenario, this presents the risk that a spark may be created during connection of the cable to the aircraft, which may ignite flammable fumes and cause a fire. To avoid such accidents, the electrical power generation system may include a contactor, which isolates the power source from the cable until the cable is connected to the aircraft and the contactor is activated.

In addition to providing electrical power, multi-function ground power carts can provide additional features to assist the servicing of the aircraft on the ground. These features may include a hydraulic power system, a conditioned air-cooling system, a liquid cooling system, a nitrogen recharging system, and a compressed air system. These additional systems may require electrical power, which can be provided by the electrical power generation system. These additional systems represent additional loads on the electrical power generation system.

The electrical power generation system is powered by a prime mover, for example, a gas turbine engine or a diesel engine, located on the ground power cart. The output shaft of the prime mover is coupled to a three-phase alternating current generator, which converts the rotational output of the prime mover into electrical power having a voltage and a current. These types of generators could be used, depending on the aircraft to be serviced.

The electrical power generation system also can include a voltage regulator with a single input that senses voltage and regulates the voltage at a single point of regulation, e.g., at the output of the generator or at the end of the cable near the aircraft. One reason to regulate the voltage is to ensure that the aircraft is receiving the correct amount of electrical power. One drawback of regulating the voltage at the output point of the generator is that voltage drops may occur across the power cable resulting in a lower voltage than needed at the aircraft. One drawback of regulating the voltage at the end of the cable is that when the contactor is open (de-energized), electric energy is prevented from traveling along the cable, i.e., between the power source and the aircraft, and therefore there is no voltage to regulate. That is, when the contactor is open, such a voltage regulator is unable to properly regulate the voltage, for the additional loads, that may be supplied by the output of the generator. Hence, in certain situations, the voltage may not be properly regulated when the contactor is open, and can only be regulated when the contactor is closed (energized).

Thus, it should be appreciated that there is a need for an external ground-based electrical power generation system that overcomes the drawbacks of the above conventional voltage regulator schemes in a multi-function ground power cart. The present invention fulfills this need as well as others.

SUMMARY OF THE INVENTION

The present invention relates to an external ground-based aircraft electrical power generation system for regulating the electrical power to an aircraft. In particular, and by way of example only, one embodiment of the aircraft electrical power generation system may include a ground power cart, a power source located on the ground power cart and having an output terminal, a contactor, and a power cable having a proximate end coupled to the output terminal of the power source and a distal end configured to be coupled to the aircraft. The ground-based aircraft electrical power generation system further includes a voltage regulator having a plurality of inputs and an output coupled to the power source. The voltage regulator monitors the voltage at the plurality of inputs and the contactor is coupled in series between the proximate end of the power cable and the distal end of the power cable. The contactor is a heavy-duty relay, and other types of relays or switches may be used as needed by a particular application.

Another embodiment of the present invention is an aircraft power regulation and supply system located on a ground power cart for use at an airport. The aircraft power regulation and supply system includes a power source having an input control terminal and an output terminal, and a power cable having a proximate end coupled to the output terminal of the power source, a distal end configured to be coupled to an aircraft, and a sensed line traveling from the proximate end to the distal end. The aircraft power regulation and supply system further includes a voltage regulator having a first input coupled to the power source, a second input coupled to the sensed line, and an output coupled to the input control terminal of the power source. The voltage regulator senses the voltage at the first input and the second input and selects the first input or the second input to use as a basis or reference to regulate the voltage being output from the output terminal of the power source. The aircraft power regulation and supply system might also include a contactor capable of being energized and de-energized and coupled between the proximate end of the power cable and the distal end of the power cable.

Another embodiment of the present invention is a method of regulating the output of a power source that is connected to a proximate end of a power cable and that is used to provide power to an aircraft. The method includes coupling a distal end of the power cable to the aircraft, monitoring the voltage at a first input of a voltage regulator that is coupled to the proximate end of the power cable and at a second input of the voltage regulator that is coupled to the distal end of the power cable, selecting the first input or the second input to use to regulate the output of the power source, and outputting a control signal to the power source that is configured to adjust the output of the power source.

These and other features and advantages of the embodiments of the invention will become apparent from the following detailed description, taken in conjunction with the accompanying drawings, which illustrate, by way of example the principles of the invention.

DETAILED DESCRIPTION OF THE PRESENTLY PREFERRED EMBODIMENTS

Systems and methods that implement the embodiments of the various features of the present invention will now be described with reference to the drawings. The drawings and the associated descriptions are provided to illustrate embodiments of the present invention and not to limit the scope of the present invention. Reference in the specification to "one embodiment" or "an embodiment" is intended to indicate that a particular feature, structure, or characteristic described in connection with the embodiment is included in at least an embodiment of the invention. The appearances of the phrase "in one embodiment" in various places in the specification are not necessarily all referring to the same embodiment. Throughout the drawings, reference numbers are re-used to indicate correspondence between referenced elements. In addition, the first digit of each reference number indicates the figure in which the element first appears.

Figure 1:
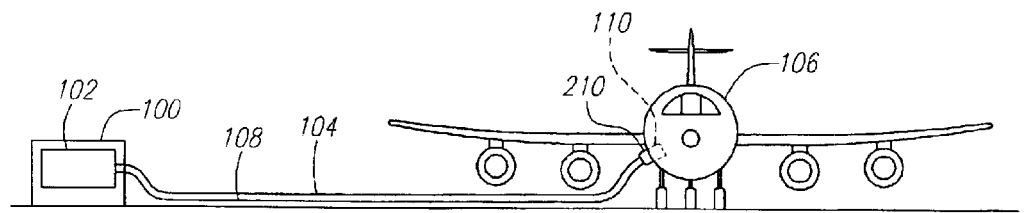
FIG. 1 is a simplified diagram of a ground power cart having an electrical power generation system configured to connect, via a cable, to an aircraft being serviced on the ground in accordance with a preferred embodiment of the present invention.

Referring now more particularly to the drawings, FIG. 1 is a simplified diagram of a ground power cart 100 having an electrical power generation system 102 configured to connect, via a power cable 104, to an aircraft 106 being serviced on the ground in accordance with a preferred embodiment of the present invention. The electrical power generation system 102 can be located on the ground power cart 100 at an airport for providing electrical power to the aircraft 106 being serviced on the ground. Alternatively, the electrical power generation system 102 could be located in other locations, such as airport buildings or a ground vehicle. The power cable 104 has a plurality of feeders 108, which are used to connect the power cable 104 to other cables or devices. Each feeder 108 is an electrical conductor, e.g., a wire. To operate the electrical power generation system 102, a worker typically connects the end of the cable 104 to an external power receptacle 110 on the aircraft 106 and turns on a power switch to supply power from the electrical power generation system 102 to the aircraft 106. Once the electrical power has been supplied to the aircraft 106, the worker can service the aircraft 106. After the aircraft 106 has been serviced, and power is not needed, the worker turns off the power switch and disconnects the cable 104 from the aircraft 106.

Figure 2:
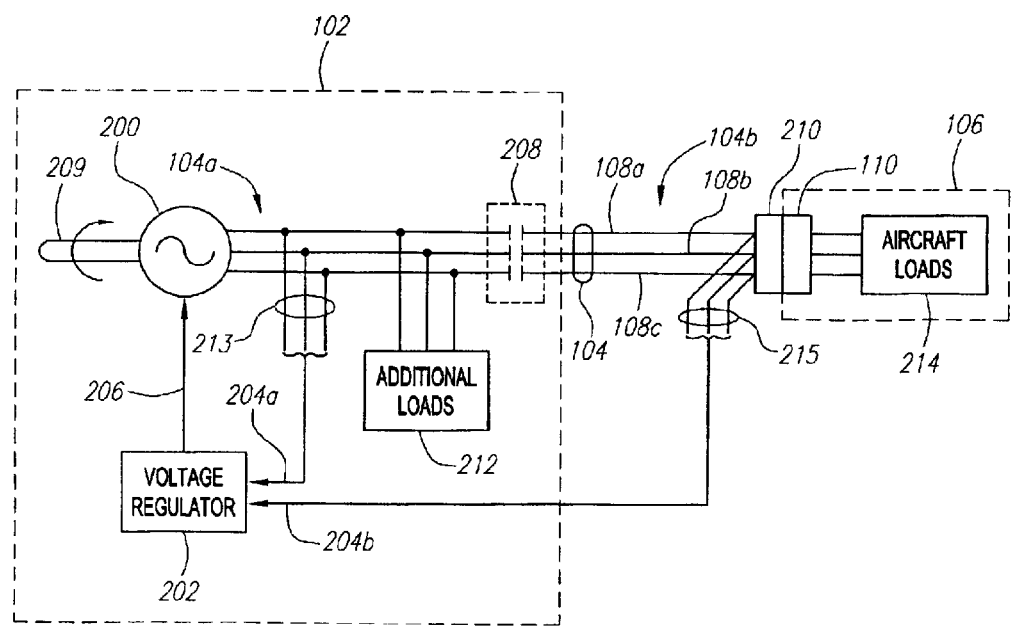
FIG. 2 is a simplified diagram of the electrical power generation system of FIG. 1 in accordance with a preferred embodiment of the present invention.

FIG. 2 is a simplified diagram of the electrical power generation system 102 of FIG. 1. The electrical power generation system 102 includes a power source 200, the power cable 104 having a proximate end 104a coupled to the power source 200 and a distal end 104b coupled to the aircraft 106, a voltage regulator 202 having a plurality of inputs 204 and an output 206 coupled to the power source 200, and a contactor 208 coupled in series between the proximate end 104a and the distal end 104b. The electrical power generation system 102 also includes a shaft 209 that is connected to a prime mover (not shown), which is typically a gas turbine engine or a diesel engine. The power source 200 is typically an alternating current (ac) power source that generates a voltage of about 115 volts root-mean-square (vrms), which is supplied to the aircraft 106. Alternatively, the power source 200 can be a direct current (dc) power source or other type, as needed by a particular application. The electrical power generation system 102 is controlled by the voltage regulator 202, which monitors the system at multiple points of regulation and selects one of these points to use, as a reference, to regulate the output voltage of the power source 200.

The voltage regulator 202 can be a three-phase ac voltage regulator that regulates, senses and monitors the voltage at the plurality of inputs 204 and determines which one of the plurality of inputs 204 to use to regulate the output voltage of the power source 200. The voltage regulator 202 has a first input 204a coupled to the proximate end 104a of the power cable 104 and a second input 204b coupled to the distal end 104b of the power cable 104. More specifically, the first input 204a is coupled to output of the power source 200 in close proximity to the distribution point of the additional loads 212 (described below) and the second input 204b is coupled to a connector 210 of the power cable 104. The connector 210 is used to connect the power cable 104 to the aircraft 106. In one embodiment, the first input 204a is coupled to the sense lines 213, which is coupled to the output of the power source 200, and the second input 204b is coupled to the sense lines 215 in the power cable 104 at the distal end 104b of the power cable 104. The first input 204a and the second input 204b are sometimes referred to as voltage sense inputs.

The voltage regulator 202 senses the voltage received from the plurality of inputs 204, e.g., the first input 204a and the second input 204b, and automatically selects one of the plurality of inputs 204 to use to regulate the output voltage of the power source 200 based on the sensed voltage. That is, based upon the voltage sensed through the plurality of inputs 204, the voltage regulator 202 selects which input to use as a reference to regulate the output of the power source 200. For example, before the worker turns on the power switch to energize the contactor 208, a voltage is sensed at the first input 204a and the voltage regulator 202 uses the voltage at the first input 204a to regulate the output of the power source 200. When the contactor 208 is energized, the second input 204b might sense a voltage on the sense line 215 of the power cable 104 at the distal end 104b of the power cable 104. For example, if a voltage of at least 10 volts, and preferably at least 100 volts, is present at the second input 204b, then the voltage regulator 202 uses the voltage at the second input 204b to regulate the output of the power source 200. In one embodiment, the voltage regulator 202 selects the second input 204b if a voltage greater than about 100 volts has been sensed on the sense lines 215. In another embodiment, the voltage regulator 202 selects the first input 204a if the second input 204b has sensed a voltage of less than about 100 volts. In one embodiment, the voltage regulator 202 selects one of the plurality of inputs 104 based on whether the contactor 208 is energized or de-energized. Hence, the voltage regulator 202 changes the point of regulation from the first input 204a to the second input 204b, and vice versa, depending on the particular application. Therefore, the voltage regulator 202 might use the second input 204b to regulate the output voltage of the power source 200. In one embodiment, the desired point of regulation is the distal end 104b of the power cable 104. When the contactor 208 is de-energized, the second input 204b might be unable to sense a voltage on the sense line 215 of the power cable 104 at the distal end 104b of the power cable 104. Therefore, the voltage regulator 202 will instead use the first input 204a to regulate the output voltage of the power source 200. Hence, the point of regulation would then be the proximate end 104a of the power cable 104.

Using the voltage sensed from one of the plurality of inputs 204, the voltage regulator 202 outputs a control signal 206 to the power source 200. The control signal 206 is a field current that is used to adjust the output of the power source 200. The field current is an analog direct current (dc).

The contactor 208 is coupled in series between the proximate end 104a of the power cable 104 and the distal end 104b of the power cable 104. The contactor 208 is used to isolate the power source 200 from the power cable 104 until the power cable 104 is properly connected to the aircraft 106. The contactor 208 can be a three-phase ac contactor that can be energized when the worker turns on a power switch and can be de-energized when the worker turns off the power switch. Other types of relays or switches may be used in place of the contactor 208.

The ground power cart 100 may have additional loads 212 connected to the proximate end 104a of the power cable 104. The additional loads 212 benefit from the voltage regulation of the power source 200 and can tolerate changes in the voltage so that the distal end 104b of the power cable 104 can receive 115 vrms. For example, if the aircraft loads 214 cause a voltage drop of about 2 vrms across the power cable 104, then the power source 200 needs to output 117 vrms so that the aircraft 106 will receive its required 115 vrms. In addition, if the additional loads 212 are located in close proximity to the power source 200, they would not suffer from the voltage drops due to the long length of the power cable 104. The aircraft 106 may have aircraft loads 214 that are coupled to the distal end 104b of the power cable 104. Generally, the aircraft loads 214 are located on the aircraft 106.

Although an exemplary embodiment of the invention has been shown and described, many other changes, combinations, omissions, modifications and substitutions, in addition to those set forth in the above paragraphs, may be made by one having skill in the art without necessarily departing from the spirit and scope of this invention. Accordingly, the present invention is not intended to be limited by the preferred embodiments, but is to be defined by reference to the appended claims.

What is claimed is:

1. A ground-based aircraft electrical power generation system for regulating the electrical power to an aircraft on the ground, the ground-based aircraft electrical power generation system comprising:
   a ground power cart;
   a power source located on the ground power cart and having an output terminal;
   a power cable having a proximate end coupled to the output terminal of the power source and a distal end configured to be coupled to the aircraft;
   a switch coupled in series between the proximate end of the power cable and the distal end of the power cable; and
   a voltage regulator having a plurality of inputs and an output coupled to the power source, the voltage regulator configured to monitor the voltage at the plurality of inputs.

2. The system of claim 1, wherein the switch is a contactor.

3. The system of claim 1, wherein the voltage regulator uses one of the plurality of inputs as a basis to regulate the voltage at the output terminal of the power source.

4. The system of claim 1, wherein the voltage regulator selects one of the plurality of inputs to use to regulate the output of the power source.

5. The system of claim 4, wherein the voltage regulator selects the one of the plurality of inputs based on whether the contactor is energized or de-energized.

6. The system of claim 1, wherein the voltage regulator automatically selects one of the plurality of inputs based on the voltage at one of the plurality of inputs.

7. The system of claim 1, wherein the voltage regulator outputs a control signal to the power source that is used to adjust the voltage being output from the output terminal of the power source.

8. The system of claim 1, wherein one of the plurality of inputs is coupled to a sense line in the power cable.

9. The system of claim 1, wherein one of the plurality of inputs is coupled to the output terminal of the power source.

10. The system of claim 1, wherein one of the plurality of inputs is coupled to a connector of the power cable.

11. The system of claim 1, wherein the plurality of inputs are voltage sense inputs.

12. An aircraft power regulation and supply system located on a ground power cart for use at an airport, the system comprising:
    a power source having an input control terminal and an output terminal;
    a power cable having a proximate end coupled to the output terminal of the power source, a distal end configured to be coupled to an aircraft, and a sensed line traveling from the proximate end to the distal end;
    a switch capable of being energized and de-energized and coupled between the proximate end of the power cable and the distal end of the power cable; and
    a voltage regulator having a first input coupled to the power source, a second input coupled to the sensed line, and an output coupled to the input control terminal of the power source, the voltage regulator configured to sense the voltage at the first input and the second input and configured to select the first input or the second input to use as a basis to regulate the voltage being output from the output terminal of the power source.

13. The system of claim 12, wherein the switch is a contactor.

14. The system of claim 12, wherein the voltage regulator selects the second input if a voltage greater than about 100 volts is present on the sensed line.

15. The system of claim 12, wherein the voltage regulator outputs a control signal to the power source that is used to adjust the voltage being output from the output terminal of the power source.

16. A method of regulating the output of a power source that is connected to a proximate end of a power cable and that is used to provide power to an aircraft, the method comprising:
    coupling a distal end of the power cable to the aircraft;
    monitoring the voltage at a first input of a voltage regulator that is coupled to the proximate end of the power cable and at a second input of the voltage regulator that is coupled to the distal end of the power cable;
    selecting the first input or the second input to use to regulate the output of the power source; and
    outputting a control signal to the power source that is configured to adjust the output of the power source.

17. The method of claim 16, wherein the selecting the first input or the second input to use to regulate the output of the power source is based on the voltage at the second input.

18. The method of claim 16, wherein the selecting the first input or the second input to use to regulate the output of the power source is based on whether a contactor is de-energized or energized.

19. The method of claim 16, further comprising producing the control signal using the first input or the second input.

20. The method of claim 16, wherein the selecting is accomplished by a predetermined control logic.

* * * * *